UNITED STATES PATENT OFFICE.

JAMES H. STEBBINS, JR., OF NEW YORK, N. Y.

DYE-STUFF OR COLORING-MATTER.

SPECIFICATION forming part of Letters Patent No. 254,064, dated February 21, 1882.

Application filed January 16, 1882. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a blue dye-stuff which is produced by the action of diethylparaphenylendiamine chloride upon an alkaline solution of the soda salt of alpha-naphthol monosulpho-acid in presence of an oxidizing agent.

In carrying out my invention I take ten pounds of nitroso-diethylaniline chloride, which I dissolve in five hundred pounds of water. To this solution I then add fifteen pounds of zinc-dust and heat the mixture under constant stirring to about 60° centigrade, by which the nitroso compound is reduced to diethylparaphenylendiamine chloride. The zinc-dust is then separated by filtering the warm solution, and to this solution I add, under constant stirring, a solution composed of fourteen pounds of the soda salt of alpha-naphthol monosulpho-acid, twelve pounds of caustic-soda solution, (1.29 specific gravity,) ten pounds of bichromate of potash, and two hundred pounds of water, and then let cool. To this mixture I add, under constant stirring and little by little, enough common acetic acid to render the previously alkaline solution slightly acid, at which point my new blue dye-stuff is thrown down as a dark-blue precipitate, which is washed with water, and may be collected on a filter and sold in the form of a paste.

My new dye-stuff is soluble in water with a fine blue color, which is changed by the addition of muriatic acid and also of oxalic acid into a pinkish red, and by the addition of an aqueous solution of tannic acid into an olive-green color.

Wool is dyed with my new dye-stuff at a temperature of 150° Fahrenheit in a neutral bath without the addition of mordants or acids. Wool mordanted with the usual alum or chrome mordants can also be dyed with the new dye-stuff in a neutral bath and at a temperature of about 150° Fahrenheit. The colors so produced on wool are of a fine pure blue color, which changes by the application of nitric acid into a lemon yellow.

In the preparation of this compound I do not limit myself to the exact proportions of ingredients, as they may be varied without departing from the principles of my invention.

What I claim as new, and desire to secure by Letters Patent, is—

The blue dye-stuff produced by the action of diethylparaphenylendiamine chloride upon an alkaline solution of the soda salt of alpha-naphthol monosulpho-acid in presence of an oxidizing agent, substantially as set forth.

In testimony whereof I have hereunto set my hand and seal in the presence of two subscribing witnesses.

JAMES H. STEBBINS, JR. [L. S.]

Witnesses:
W. HAUFF,
CHAS. WAHLERS.